UNITED STATES PATENT OFFICE.

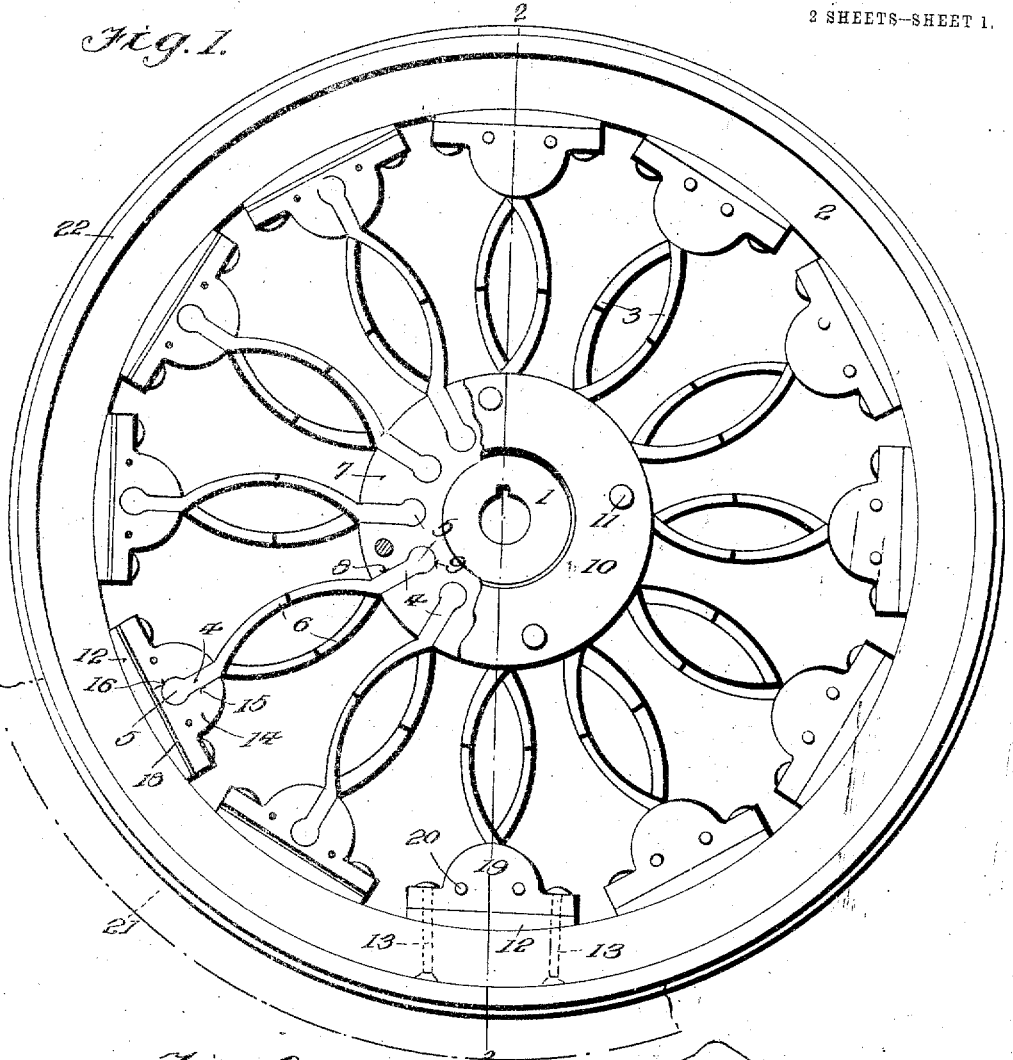
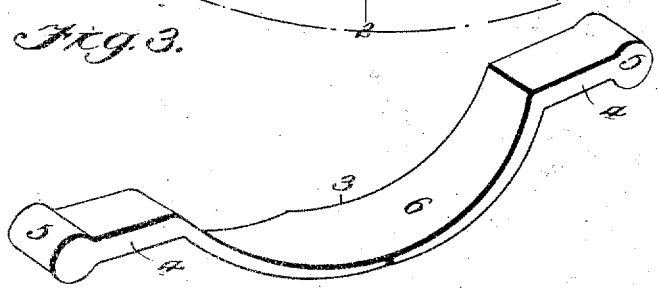

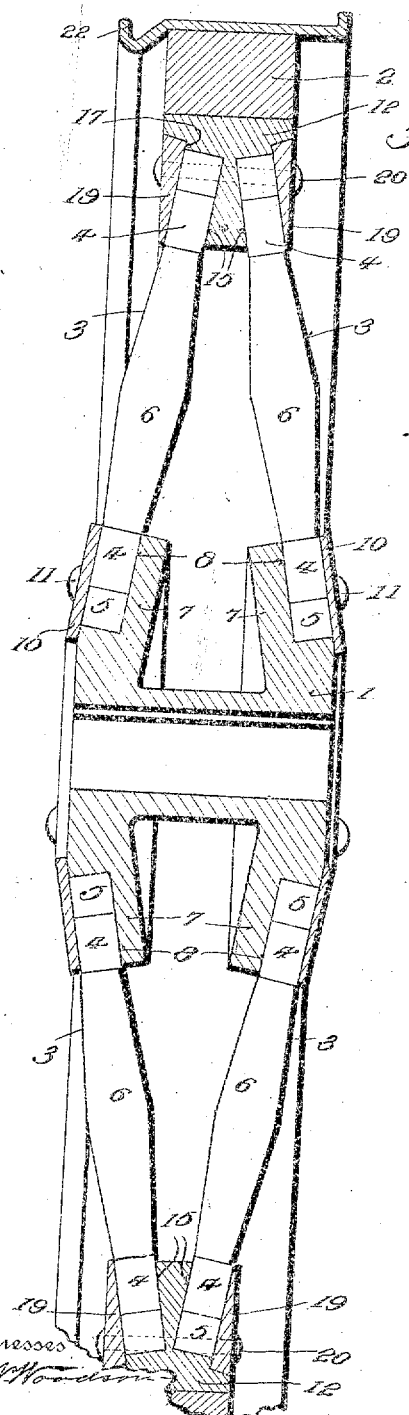

REX E. ARNOLD AND CLARKSON P. HOCKETT, OF KOUTS, INDIANA.

RESILIENT WHEEL.

1,021,440.   Specification of Letters Patent.   Patented Mar. 26, 1912.

Application filed June 29, 1911. Serial No. 636,045.

*To all whom it may concern:*

Be it known that we, REX E. ARNOLD and CLARKSON P. HOCKETT, citizens of the United States, residing at Kouts, in the county of Porter and State of Indiana, have invented certain new and useful Improvements in Resilient Wheels, of which the following is a specification.

The present invention relates to resilient vehicle wheels, and the primary object of the invention is to improve the construction of the wheel on which we obtained Letters Patent No. 994,297 dated June 6, 1911.

Another object of the invention is to provide improved spring spokes for yieldably connecting the hub and the rim, each spoke gradually decreasing in thickness toward its middle point in order to possess a maximum degree of resiliency, and gradually increasing in width toward said middle point to compensate for the decrease in thickness and thus insure against the spring being unduly weakened.

With these and other objects in view, as will more fully appear as the description proceeds, the invention consists of certain constructions, arrangements and combinations of the parts that we shall hereinafter fully describe and claim.

For a full understanding of the invention, reference is to be had to the following description and accompanying drawings, in which:

Figure 1 is a side elevation of the wheel, parts being broken away; Fig. 2 is an enlarged transverse section on the line 2—2 of Fig. 1; Fig. 3 is a perspective view of one of the spokes detached; Fig. 4 is an end view of the hub; Fig. 5 is a detail perspective view of one of the rim-engaging blocks; Fig. 6 is a similar view of one of the block face plates.

Corresponding and like parts are referred to in the following description and indicated in all the views of the accompanying drawings by the same reference characters.

The wheel comprises a hub 1, a rim 2, and a plurality of spring spokes 3, the spokes being in the form of bars of steel or other suitable metal. The spokes are all substantial duplicates and hence only one of the same will be specifically described. The spoke has approximately radially disposed end portions 4 which are formed at their terminals with transversely extending cylindrical heads 5, and which are securely attached to the hub and the rim in a manner to be hereinafter described. The intermediate portion 6 of the spring spoke is bowed, as shown, so as to enable the spoke to yield freely in a radial direction in the operation of the wheel. The spoke preferably tapers gradually in thickness from its ends toward its middle point for the purpose of increasing the resiliency of the bowed intermediate portion 6. To compensate for the variation in the thickness of the spoke, the intermediate portion 6 is gradually increased in width from its juncture with the end portions 4 to its middle point, thereby rendering the spoke of greatest width at the point where it is thinnest and preventing the spoke from being unduly weakened at this point.

The spokes are preferably arranged in two sets, the spokes of the respective sets being located at the opposite sides of the wheel and being inclined from the ends of the hub toward the plane of the rim. Corresponding spokes of these sets are secured to the hub and the rim in transverse alinement, while their intermediate portions 6 are reversely bowed so as to face in opposite circular directions.

The sets of spokes are secured to the hub in transversely spaced relation by means of annular peripheral flanges 7 outstanding from the ends of the hub. Each flange is formed with a series of radially disposed sockets 8 opening outwardly through its periphery, as shown in Fig. 2, for the reception of the inner end portions 4 of the spokes of one set, the flange and the sockets being inclined at the same angle as the spokes. The sockets also open outwardly through the outer face of the flange in order to permit the spokes to be readily inserted in position from the corresponding side of the wheel. At their inner ends, that is, their ends remote from the periphery of the flange, the sockets are formed with cylindrical enlargements 9 in which the heads 5 are seated to prevent the spokes from being withdrawn from the flange in a radial direction. To retain the spokes against lateral displacement from the sockets, an annular cover plate 10 is fitted against the outer face of the flange and is detachably secured thereto by screws or other suitable fastening devices 11.

The connections between the spokes and the rim are effected through the medium of a series of coupling blocks 12 which are secured to the rim at regular intervals and which are equal in number to half the total number of spokes in the wheel, this number of blocks being entirely sufficient since each block is adapted to receive two spokes. Each block has its outer face longitudinally curved to fit the inner surface of the rim 2, and is rigidly secured at its ends to the rim by suitable fastening devices 13. Intermediate of its ends the block is formed on its inner face with a transversely disposed boss 14 of substantially semi-cylindrical form, the boss being provided with a pair of separate transversely spaced sockets 15 that extend radially with respect to the center of the wheel and accommodate the outer end portions 4 of corresponding spokes of the two sets. These sockets are substantially similar to the sockets 8 of the hub flanges and have cylindrical enlargements 16 at their ends adjacent to the rim for the reception of the heads 5, the sockets being inclined similarly to the spokes and opening outwardly at opposite sides of the boss to permit the spokes to be inserted laterally therein. The coupling block is recessed or undercut on each side, as indicated at 17, to provide a longitudinal shoulder 18 which extends throughout the entire length of the block and faces toward the center of the wheel, the block having its side face inclined inwardly from said shoulder so as to lie flush with the outer edge of the spoke fitted in the corresponding socket. To close the open side of the socket a face plate 19 is fitted in the recess 17 and against the undercut face of the coupling block and is secured to the block by bolts 20 or the like, the bolts preferably passing entirely through the block and through both face plates. The face plates are thus supported by the shoulders 18 so that the clamp bolts 20 are relieved largely from strain. The face plate also bears against the shoulder 18 and conforms to the contour of the coupling block and is wedge-shape in cross section, whereby to entirely fill the recess 17 and to lie flush with the outer portion of the side of the block.

The wheel is completed by a cushion tire 21 of solid rubber or other suitable material or substance, that encircles the rim 2 and is preferably detachably mounted thereon by means of a relatively broad clencher rim 22.

Having thus described the invention, what we claim as new is:

1. A spring spoke gradually decreasing in thickness from its ends toward an intermediate point, and gradually increasing in width toward said point to compensate for the decrease in thickness.

2. A spring spoke gradually decreasing in thickness from its ends toward an intermediate point and gradually increasing in width toward said point to compensate for the decrease in thickness, the intermediate portion of the spoke being bowed laterally and the end portions being straight and in alinement longitudinally of the spoke.

In testimony whereof, we affix our signatures in presence of two witnesses.

REX E. ARNOLD. [L. S.]
   CLARKSON P. HOCKETT. [L. S.]

Witnesses:
 JOHN WULF,
 JOHN G. BENKIE.